United States Patent [19]
Vogel

[11] Patent Number: 4,586,750
[45] Date of Patent: May 6, 1986

[54] PASSENGER SEAT WITH ARMRESTS

[75] Inventor: Ignaz Vogel, Karlsruhe, Fed. Rep. of Germany

[73] Assignee: Ignaz Vogel GmbH & Co. KG, Karlsruhe, Fed. Rep. of Germany

[21] Appl. No.: 617,019

[22] Filed: Jun. 4, 1984

[51] Int. Cl.⁴ .............................................. A47C 7/54
[52] U.S. Cl. .................................. 297/417; 297/411; 16/DIG. 6
[58] Field of Search ............... 297/150, 154, 487, 488, 297/417; 403/146, 148, 145; 16/DIG. 6; 384/428, 439

[56]  References Cited
U.S. PATENT DOCUMENTS

| | | | |
|---|---|---|---|
| 30,461 | 12/1880 | Bogar et al. | 384/428 |
| 1,004,237 | 9/1911 | Brandes | 403/146 X |
| 1,766,882 | 6/1930 | Chryst | 403/148 |
| 2,098,500 | 11/1937 | Koenigkramer | 297/417 |
| 2,844,193 | 7/1958 | Lauterbach | 297/417 X |
| 3,362,671 | 1/1968 | Johnson | 403/146 X |
| 3,472,541 | 10/1969 | Hulten | 403/146 |
| 3,542,427 | 11/1970 | Herpel | 297/417 |
| 3,544,163 | 12/1970 | Krein | 297/417 |
| 3,591,216 | 7/1971 | Onufer | 403/146 |
| 4,018,104 | 4/1977 | Bland et al. | 403/146 X |
| 4,471,246 | 9/1984 | Paillet | 384/428 X |
| 4,491,436 | 1/1985 | Easton | 403/146 X |

Primary Examiner—William E. Lyddane
Assistant Examiner—Laurie K. Cranmer
Attorney, Agent, or Firm—Klaus J. Bach

[57]  ABSTRACT

A passenger seat with seating and backrest sections has an armrest pivotally supported on armrest support means by a bearing including an elastomeric ring structure disposed in wedge-shaped grooves formed opposite one another in the joint of the armrest and the armrest support means. The armrest and armrest support means are held in engagement by a bolt extending through a relatively large opening in one and screwed into the other of the armrest and the armrest support means and the elastomeric ring structure is axially wedged into the grooves to provide firm radial bearing support which prevents contact between the bolt and the walls of the opening so as to prevent rattling.

4 Claims, 5 Drawing Figures

PASSENGER SEAT WITH ARMRESTS

BACKGROUND OF THE INVENTION

The invention relates to a passenger seat with armrests mounted on the sides of the seat.

Such armrests are subject to heavy wear not only with regard to their use but they are also exposed to forces caused by the movement of a vehicle in which the seats are installed. Extreme forces are effective, for example, during an accident. Armrests of passenger seats installed in buses are over-dimensioned so as to be able to withstand forces occurring under special extreme circumstances. These armrests are therefore usually firmly mounted on the seat or its support frame.

Although such firm mounting is quite suitable, it is usually uncomfortable to take place on such a seat since the legroom available between the passenger seats is generally limited and access to the seats is blocked by the armrest. Armrests are, therefore, often pivotally supported on the armrest's support so that they can be pivoted out of the way.

Such armrests, however, tend to rattle after a relatively short period of use since the forces applied are occasionally quite large. Heavy duty bearing structures for pivotal armrests, however, would be expensive and heavy.

It is, therefore, the main object of the present invention to provide for a passenger seat and armrest pivot bearing which is inexpensive, light and which can withstand vibration and shock forces without gaining a tendency to rattle.

SUMMARY OF THE INVENTION

In a passenger seat with seating and backrest sections, armrests are pivotally supported on armrest support means by a bearing arrangement including an elastomeric ring structure disposed in wedge-shaped grooves formed opposite one another in the joint sections of the armrest and armrest support means. The elastomeric ring structure and grooves are concentric with, and radially spaced from, the armrest pivot axis so as to avoid large axial forces on the elastomeric ring structure. A mounting bolt extends through a relatively large opening in one, and is screwed into the other, of the armrest and armrest support means so as to wedge the elastomeric ring structure into the grooves and provide firm radial support for the armrest on the armrest support structure, thereby maintaining the bolt in the center of the opening to prevent contact thereof with the wall of the bore and avoid rattling.

With such an armrest support structure, the support areas of the intermediate elastic members are relatively small and, furthermore, the distance of the support area from the pivot axis is relatively large so that the vibration forces which cause the rattling of the armrests are relatively small. If, furthermore, the elastomeric rings have slightly conical ends and there is sufficient clearance between the mounting bolt or sleeve and the mounting hole, all the support forces are taken up by the circumferential inner and outer surface areas of the elastomeric ring structure so that rattling of the support shaft in the support hole is avoided. Wear of the elastomeric ring structure is not readily noticeable because the relatively large diameter would require substantial wear before noticeable play would occur.

The elastomeric ring structure may be circular in cross section and the grooves may be correspondingly formed. Preferably, however, the grooves are somewhat conical and the elastomeric ring structure is wedge shaped at both sides so as to fit into the grooves. It is desirable to provide a relatively small wedge angle and inclined cone angle of the grooves, that is, one which causes self-locking of the armrest so that the armrest is retained in any desired pivot position.

Wear resistant elastomers are generally known; usually, however, wear resistance is obtained at the expense of elasticity. In one embodiment therefore, the elastomeric ring structure consists of an elastomeric ring of rectangular cross section, which ring has conical metallic washers mounted, preferably cemented, on opposite sides thereof. The friction between such an elastomeric ring structure and the armrest or the armrest support is between the conical metal washer and the adjacent other part engaged therewith so that wear is reduced to a minimum. In accordance with the kind of metals of the engaged surfaces—metal to metal—the cone or included angles of the elastomeric ring structure and the groove should be so selected that self-locking occurs, that is, that the armrest may be pivoted by a predetermined force but that the armrest remains in any desired position without rattling.

SHORT DESCRIPTION OF THE DRAWINGS

DESCRIPTION OF THE PREFERRED EMBODIMENTS

Figure 1:
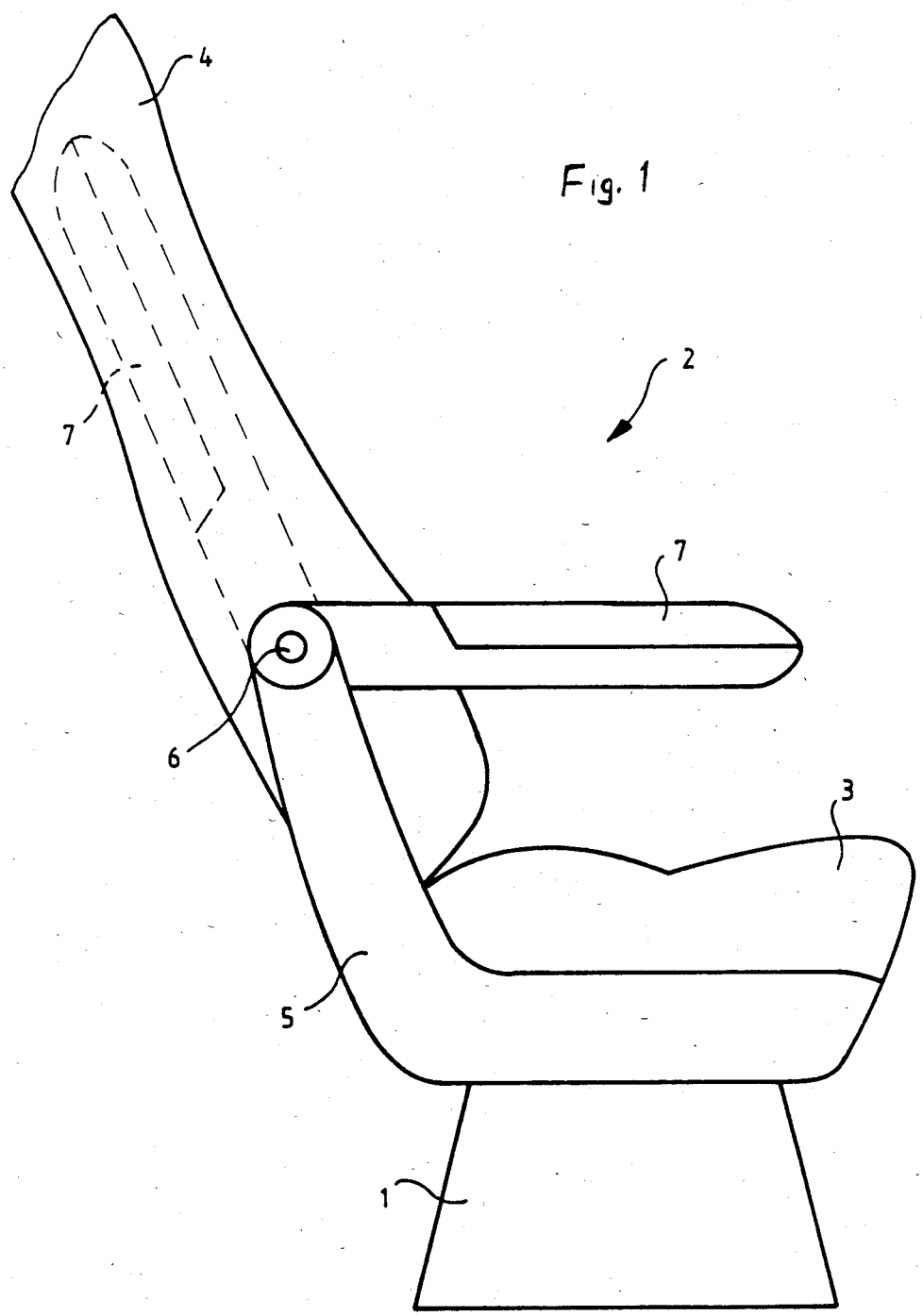
FIG. 1 shows a passenger seat with pivotally supported armrest.

FIG. 1 discloses a passenger seat 2 having a base 1 carrying a seat portion 3 and a backrest 4. An armrest support member 5 projects upwardly from the base 1 and carries at its upper end a pivot bearing 6 pivotally supporting on armrest 7. The armrest 7 is shown in full lines in its use position; it is shown in broken lines pivoted upwardly as when not in use.

Figure 2:
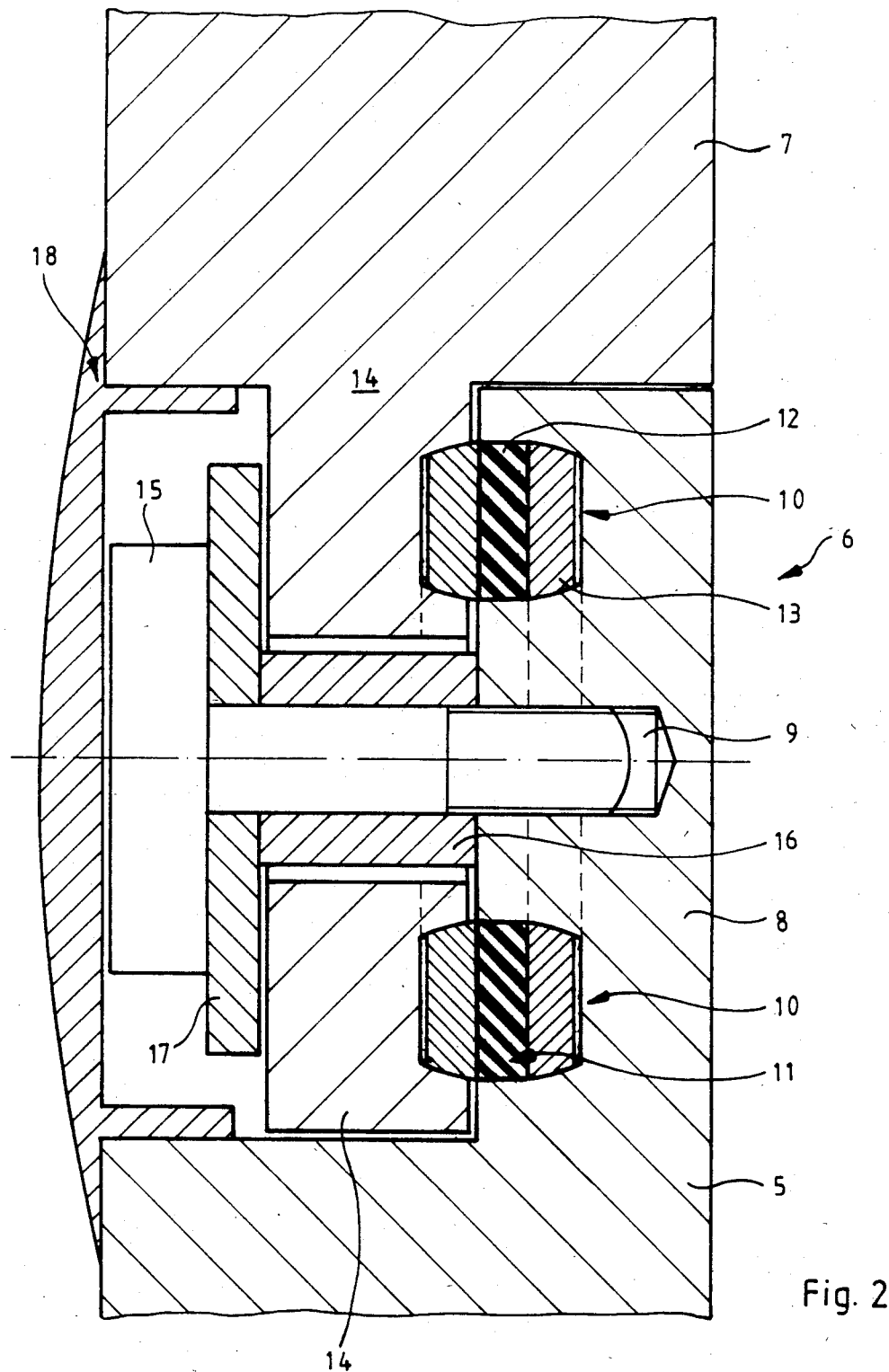
FIG. 2 shows one embodiment of the armrest pivot bearing structure.

FIG. 2 shows one embodiment of the pivot bearing 6. The armrest support member 5 has at its side a mounting plate projection 8 which has a central threaded bore 9. Concentric with the central threaded bore 9 the projection 8 has a circular groove 10 whose axial, that is, circular, wall areas are slightly conical with wider open ends. Disposed within the groove 10 is an elastomeric ring structure 11 which consists of an elastomeric ring 12 of rectangular cross section which has conical metal washers 13 mounted, that is, preferably cemented, on the opposite sides thereof. The armrest 7 has a projecting pivot plate 14 which is pivotally mounted on the mounting plate projection 8 by means of a bolt 15 with a spacer sleeve 16 and a washer 17 which engages the pivot plate 14 on a relatively large area and forces the pivot plate into engagement with the elastomeric ring 12. The pivot bearing 6 is covered by a plastic lid 18. With this kind of pivot bearing 6, the armrest 7 is radially fully supported on the metallic conical surfaces of the elastomeric ring structure 12, which itself is engaged and supported in the groove 10 of the mounting plate projection 8. The bolt 15 does not provide radial support; it only holds the projections 8 and 14 in engagement with the ring structure 12. Rattling of the armrest 7 is safely prevented with this arrangement.

Figure 3:
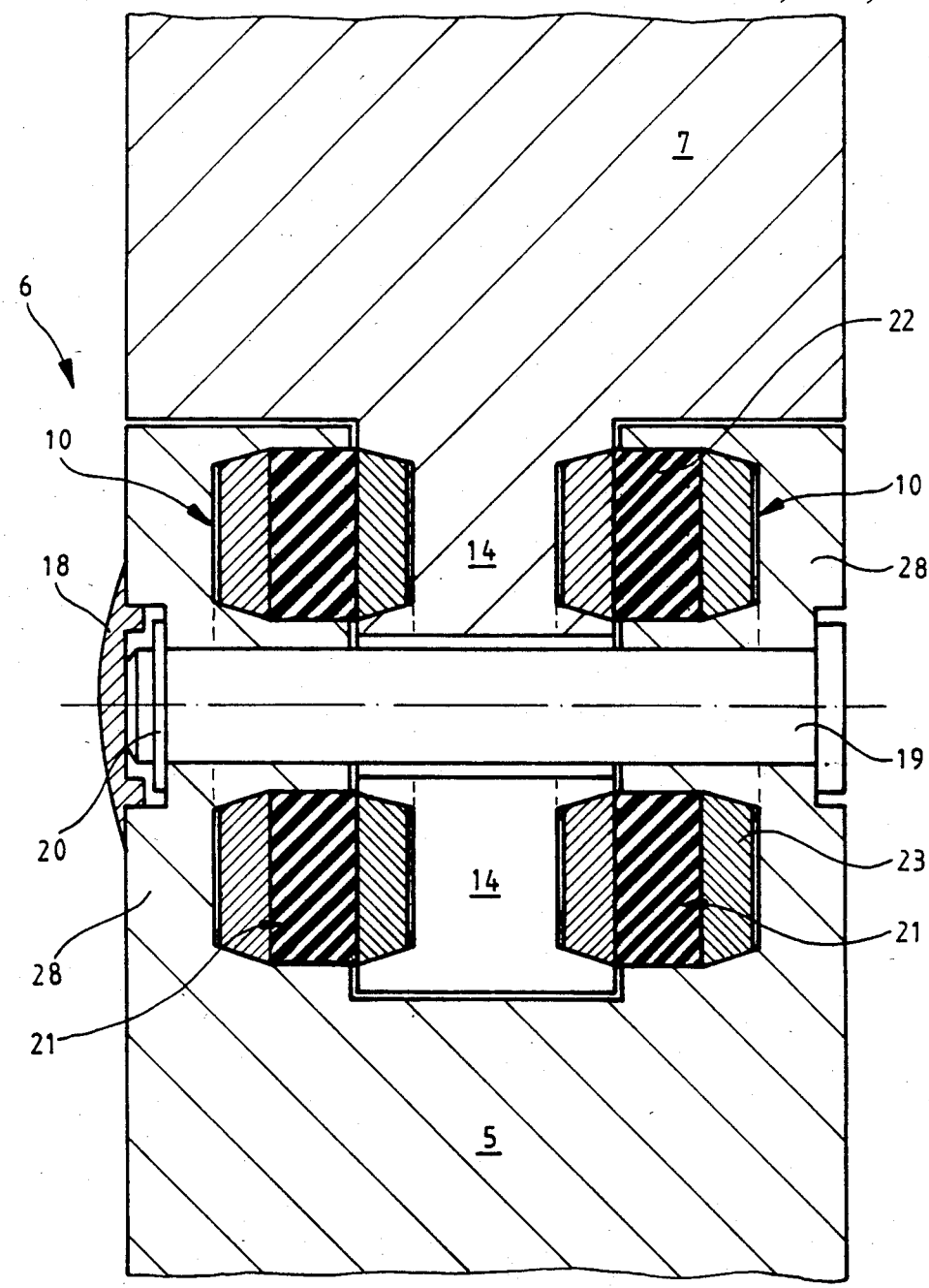
FIG. 3 shows another embodiment of the pivot bearing.

FIG. 3 shows a similar arrangement for the pivot bearing 6 wherein, however, the armrest support member 5 has at its free end a forked bearing bracket between which the armrest pivot plate 14 is engaged by the elastomeric ring structures 21 and held by a bolt 19 secured by a locking plate 20. Again, the bearing structure is covered by a plastic lid 18.

In FIG. 3, the elastomeric ring structures are shown projecting into the armrest pivot plate 14 to a greater extent than they do. They have actually smaller metallic end cones and larger resilient ring sections than those of FIG. 2 so that they can be axially compressed. For mounting of the pivot plate 14 in the forked bracket, the elastomeric ring structures are first inserted into grooves 10 formed in the brackets 28 and the pivot plate 14 of the armrest 7 is then forced into the forked bracket by axially compressing the ring section 22 in the groove 10. Only when the pivot plate 14 is properly positioned will the elastomeric ring structures jump back into their proper position as shown in FIG. 3. Again, with this arrangement, pivotal support of the armrest 7 is provided by the elastomeric ring structures 21 on the metallic sections 23 thereof, not on the pivot bolt 19 which only serves to secure the engagement of the armrest and armrest support. With this arrangement, rattling of the armrests is prevented and the armrests are firmly retained in their use positions as well as in their retracted positions.

In its use position the armrest rests, of course, on a stop which prevents further downward pivoting. A similar stop may also be provided in the inwardly pivot end position of the armrest.

Figure 4:
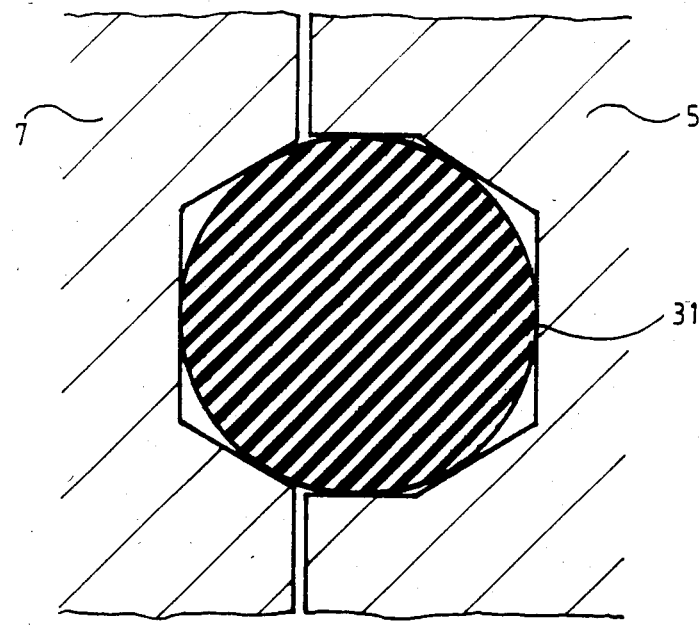
FIG. 4 shows a cross section of an elastomeric ring in grooves.

FIG. 4 shows another bearing arrangement wherein an elastomeric ring 31 with circular cross section is utilized.

Figure 5:
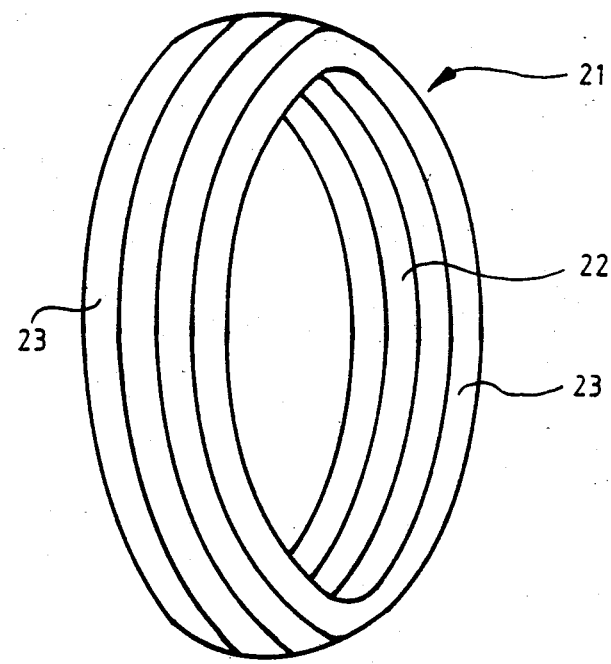
FIG. 5 is an isometric view of a sandwich-type elastomeric ring structure.

FIG. 5 is an elevational view of the composite elastomeric ring structure consisting of a ring section 22 of elastomeric material which has conical metal discs 23 cemented to the opposite sides thereof. The conical metal discs 23 are firmly engaged in the correspondingly conical side walls of the grooves 10 when the metal discs 23 are forced into the grooves.

I claim:

1. A passenger seat comprising seating and backrest sections, armrest support means associated with said seating and backrest sections, and an armrest pivotally supported on said armrest support means about a pivot axis, said armrest and armrest support means having circular grooves formed therein radially spaced from, and concentric with, the pivot axis of said armrest and disposed opposite one another and shaped so as to form together an annular cavity with wedge-shaped axial ends, a bearing ring comprising an elastomeric material disposed in said annular cavity between said armrest support means and said armrest, said bearing ring having conical side sections corresponding to a wedge-shaped annular cavity, and a bolt extending through an opening in one, and threaded into the other, of said armrest and said armrest support means for axially compressing said armrest and armrest support means into firm engagement with the elastomeric bearing ring therebetween, the opening in said one of said armrest and armrest support means being substantially larger in diameter than said bolt so as to provide, between said bolt and the walls defining said opening, a clearance which is sufficient to prevent contact between said walls and said bolt, thereby to prevent rattling of said armrest.

2. A passenger seat according to claim 1, wherein said elastic bearing ring structure comprises a central ring section of elastomeric material and rectangular in cross section and conical metal discs mounted on the opposite sides of said elastomeric central section.

3. A passenger seat according to claim 2, wherein said conical metal discs are cemented onto said elastomeric central section.

4. A passenger seat according to claim 1, wherein said armrest support member has a mounting plate and said armrest has a projecting pivot plate disposed adjacent said mounting plate and said bearing ring structure is disposed in grooves formed in the adjacent surfaces of said mounting plate and said projecting pivot plate.

* * * * *